United States Patent
Luo et al.

(10) Patent No.: US 9,558,763 B1
(45) Date of Patent: Jan. 31, 2017

(54) MAGNETIC RECORDING WRITE APPARATUS HAVING A POLE INCLUDING AN ASSIST PORTION EXTENDING IN THE CROSS-TRACK DIRECTION

(71) Applicant: Western Digital (Fremont), LLC, Fremont, CA (US)

(72) Inventors: Peng Luo, San Ramon, CA (US); Yunfei Li, Fremont, CA (US); Zhigang Bai, Fremont, CA (US); Hai Sun, Milpitas, CA (US); Feng Liu, San Ramon, CA (US); Zhanjie Li, Pleasanton, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 15/081,727

(22) Filed: Mar. 25, 2016

(51) Int. Cl.
    *G11B 5/127* (2006.01)
    *G11B 5/31* (2006.01)

(52) U.S. Cl.
    CPC ........... *G11B 5/1278* (2013.01); *G11B 5/3116* (2013.01)

(58) Field of Classification Search
    CPC ..... G11B 5/1278; G11B 5/3116; G11B 5/315; G11B 5/6082
    See application file for complete search history.

(56) References Cited

U.S. PATENT DOCUMENTS

| | | | | |
|---|---|---|---|---|
| 7,633,714 B2 * | 12/2009 | Sasaki | ........ | G11B 5/11 360/125.02 |
| 7,872,835 B2 * | 1/2011 | Guan | ........ | G11B 5/3116 360/319 |
| 7,898,773 B2 * | 3/2011 | Han | ........ | G11B 5/11 360/125.09 |
| 7,978,431 B2 * | 7/2011 | Han | ........ | G11B 5/3116 29/603.07 |
| 8,031,434 B2 * | 10/2011 | Le | ........ | G11B 5/3163 360/125.08 |
| 8,035,930 B2 * | 10/2011 | Takano | ........ | G11B 5/1278 360/319 |
| 8,117,737 B2 * | 2/2012 | Watanabe | ........ | G11B 5/115 216/22 |
| 8,166,631 B1 * | 5/2012 | Tran | ........ | G11B 5/1278 216/22 |
| 8,233,236 B2 * | 7/2012 | Kim | ........ | G11B 5/3116 360/125.16 |
| 8,254,060 B1 * | 8/2012 | Shi | ........ | G11B 5/3163 360/125.08 |

(Continued)

*Primary Examiner* — Brian Miller
(74) *Attorney, Agent, or Firm* — Convergent Law Group LLP

(57) ABSTRACT

A magnetic write apparatus has a media-facing surface (MFS), a pole, side shield(s), a side gap and coil(s) for energizing the pole. The pole includes main and assist portions. The main portion is ferromagnetic, includes a pole tip and includes side surface(s) having a flare angle from the MFS. The pole tip occupies a portion of the MFS. The flare angle is nonzero and acute. The assist portion adjoins the main portion, extends from the main portion in a direction having a component in a cross-track direction, and has a depth of not more than three hundred nanometers. The side shield(s) occupy another portion of the MFS, have a back surface, and are between the assist portion and the MFS. The assist portion is conformal with the back surface of the side shield(s). The side gap is between the main portion of the pole and the side shield(s).

21 Claims, 7 Drawing Sheets

(56) References Cited

U.S. PATENT DOCUMENTS

| | | | | |
|---|---|---|---|---|
| 8,295,008 B1* | 10/2012 | Sasaki | ............... | G11B 5/1278 360/125.02 |
| 8,300,359 B2* | 10/2012 | Hirata | ............... | G11B 5/1278 360/122 |
| 8,470,185 B2* | 6/2013 | Mino | ............... | G11B 5/1278 216/22 |
| 8,520,336 B1 | 8/2013 | Liu et al. | | |
| 8,724,259 B1* | 5/2014 | Liu | ............... | G11B 5/1278 360/125.15 |
| 8,792,208 B1* | 7/2014 | Liu | ............... | G11B 5/1278 360/125.03 |
| 8,804,281 B1 | 8/2014 | Tang et al. | | |
| 9,111,550 B1 | 8/2015 | Liu et al. | | |
| 2008/0112088 A1* | 5/2008 | Hsiao | ............... | G11B 5/1278 360/319 |

\* cited by examiner

Apex View

MFS View

Plan View

MAGNETIC RECORDING WRITE APPARATUS HAVING A POLE INCLUDING AN ASSIST PORTION EXTENDING IN THE CROSS-TRACK DIRECTION

BACKGROUND

FIGS. 1A and 1B depict air-bearing surface (ABS) and top views of a conventional magnetic recording apparatus 10. The magnetic recording apparatus 10 may be a perpendicular magnetic recording (PMR) apparatus or other magnetic write apparatus. The conventional magnetic recording apparatus 10 may be a part of a merged head including the write apparatus 10 and a read apparatus (not shown). Alternatively, the magnetic recording head may only include the write apparatus 10.

The write apparatus 10 includes a leading shield 12, a nonmagnetic gap layer 14, side shield(s) 16, a pole 20 and a trailing shield 30. The apparatus 10 may also include other components including but not limited to coils for energizing the pole 20. The trailing surface (top) of the pole 20 is wider than the leading surface (bottom) of the pole 20.

Although the conventional magnetic recording apparatus 10 functions, there are drawbacks. In particular, the side shields 16 may have tails 17 developed during fabrication. These tails 17 cause the side shields 16 to have a longer effective throat height (distance from the ABS). The tails 17 also result in additional shunting of magnetic flux from the pole 20. Thus, performance may be adversely affected. Accordingly, what is needed is a system and method for improving the performance of a magnetic recording write apparatus 10.

DETAILED DESCRIPTION OF THE PREFERRED EMBODIMENTS

Figure 1A:
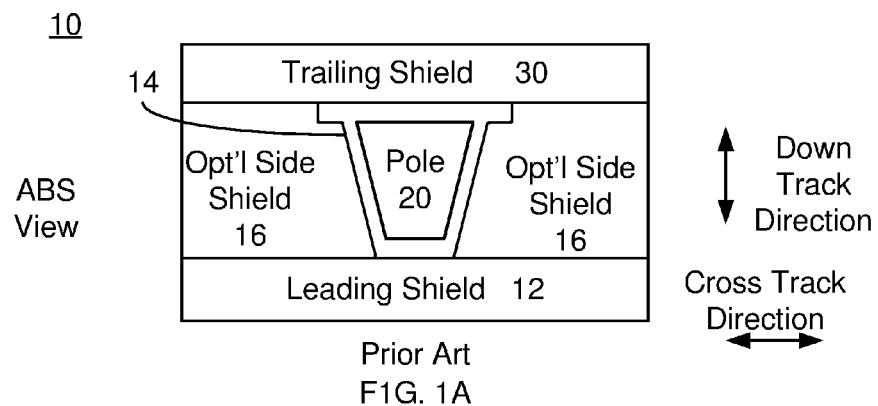
FIGS. 1A-1B depict ABS and top views of a conventional magnetic recording apparatus.

While the various embodiments disclosed are applicable to a variety of data storage devices such as magnetic recording disk drives, solid-state hybrid disk drives, networked storage systems etc., for the sake of illustration the description below uses disk drives as examples.

FIGS. 2A, 2B, 2C and 2D depict side, close-up apex, media-facing surface (MFS) and top views of an exemplary embodiment of a portion of a data storage device 100 including a write apparatus 120. For clarity, FIGS. 2A, 2B, 2C and 2D are not to scale. Because the data storage device 100 is a disk drive, the MFS is an AB). For simplicity not all portions of the disk drive 100 and apparatus 120 are shown. In addition, although the disk drive 100 and write apparatus 120 are depicted in the context of particular components other and/or different components may be used. For example, circuitry used to drive and control various portions of the disk drive 100 is not shown. For simplicity, only single components are shown. However, multiples of each components and/or and their sub-components, might be used. The disk drive 100 may be a PMR disk drive. However, in other embodiments, the disk drive 100 may be configured for other types of magnetic recording.

The disk drive 100 includes media 102, a slider 110 and a write apparatus 120. The write apparatus 120 is fabricated on the slider 110 and includes a MFS. In the embodiment shown, the MFS is proximate to the media 102 during use. Although not shown, the slider 110 and thus the apparatus 120 are generally attached to a suspension. In general, the disk drive 100 includes a write apparatus 120 and a read apparatus (not shown). However, for clarity, only the write apparatus 120 is shown. The write apparatus 120 includes coils 122, write gap 124, trailing shield 126, pole 130, side gap 140 and side shields 145. The apparatus may also include a leading shield 123. In the embodiment shown, the side gap 140 is also a bottom gap. Multiple structures on which the leading shield 123 and pole 130 are fabricated may reside below the components shown. As discussed above, portions of the components 122, 123, 124, 126, 130, 140 and 145 may include multiple layers. In other embodiments, different and/or additional components may be used in the write apparatus 120.

Figure 2A:
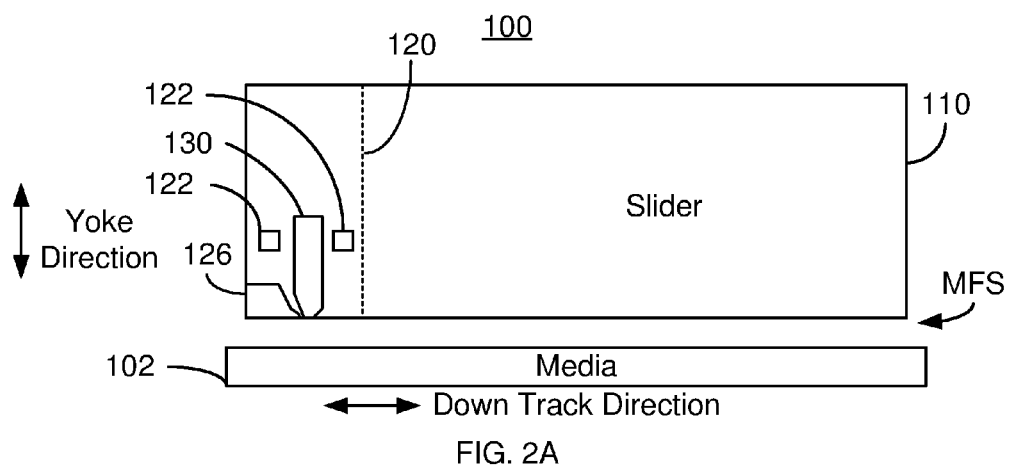
FIGS. 2A, 2B, 2C and 2D depict side, close-up side, MFS and top views of an exemplary embodiment of a magnetic recording disk drive.

The coil(s) 122 are used to energize the pole 130. Two turns 122 are depicted in FIG. 2A. Another number of turns may, however, be used. Note that only a portion of the coil(s) 122 is shown in FIG. 2A. Additional turns and/or additional layers of coils may be used. If, for example, the coil(s) 122 form a spiral, or pancake, coil, then additional portions of the coil(s) 122 may be located further from the ABS. The coil(s) 122 may also be a helical coil.

Figure 2B:
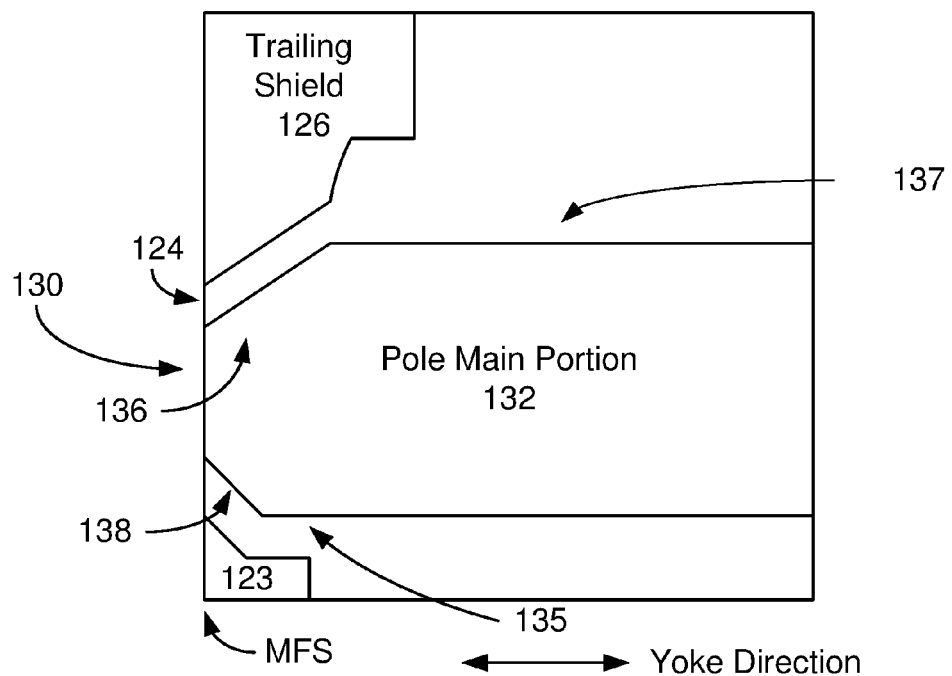
Figure 2C:
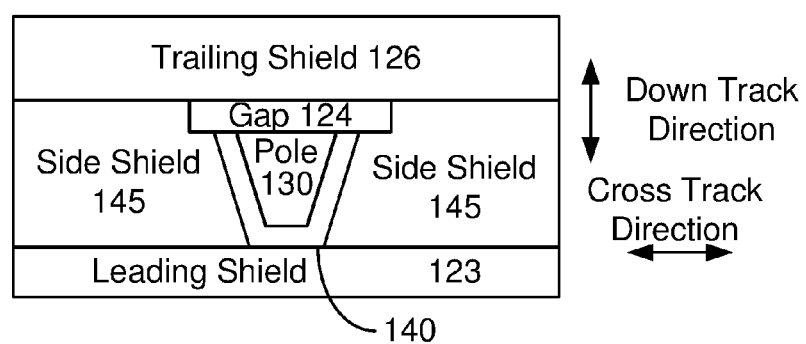

The pole 130 includes a main portion 132 and an assist portion 134. The main portion is ferromagnetic and may have a high saturation magnetization in excess of 2.0 T. For example, the saturation magnetization of the main portion 132 may be 2.4 T. The main portion 132 pole tip 135 close to the MFS and a yoke 137 recessed from the MFS. In some embodiments, the pole tip 135 occupies a portion of the MFS. This is shown in FIGS. 2A-2D. The pole tip region 135 also includes sidewalls in the cross track direction. The sidewalls are generally configured such that the pole 130 has a bottom and a top wider than the bottom. In addition, the sidewalls are oriented at a flare angle, θ, from a direction parallel to the MFS. The flare angle is greater than zero and less than ninety degrees. In some embodiments, the flare angle is at least forty-five degrees and not more than seventy degrees. The pole tip region 135 is shown as having bottom/leading surface 138 and a top/trailing surface 136. As can be seen in FIG. 2B, in the embodiment shown, both the leading surface 138 and the trailing surface 136 are beveled. In other embodiments, one or both of the leading surface 138 and trailing surface 136 may not be beveled, instead extending in a direction substantially perpendicular to the MFS.

The assist portion 134 adjoins the main portion 132 of the pole 130. The assist portion 134 may be ferromagnetic. In some embodiments, the assist portion 134 may have a high saturation magnetization exceeding 2.0 T. In some embodiments, the saturation magnetization may be 2.4 T. Thus, the assist portion 134 and main portion 132 may be formed of the same materials. In other embodiments, different materials may be used for different portions 132 and 134 of the pole 130. For example, the assist portion 134 and main portion 132 may both be ferromagnetic but have different saturation magnetizations. Alternatively, the main portion 132 may be ferromagnetic, while the assist portion 134 is nonmagnetic. The depth, d, of the assist portion 134 in the yoke direction (perpendicular to the MFS) may also be small. For example, the assist portion 134 may have a depth of not more than three hundred nanometers. In some embodiments, the assist portion 134 has a depth of not more than one hundred nanometers. In some such embodiments, the depth of the assist portion 134 is not more than fifty nanometers.

The assist portion 134 extends from the main portion in the cross-track direction. In the embodiment shown, the assist portion 134 is substantially parallel to the MFS in the cross-track direction. In other embodiments, other shapes are possible. For example, the assist portion 134 may be curved. In either case, the assist portion 134 extends in a direction having a component parallel to the MFS in a cross-track direction. In some cases, the assist portion 134 has a width, w, in the cross-track direction of at least 0.2 microns and not more than 2 microns. In some embodiments, the width of the assist portion 134 is not more than one micron. The assist portion 134 may thus be at least as wide as the tails 17 in a conventional magnetic writer. The assist portion 134 may, but need not be, as wide as or wider than the side shields 145.

Figure 2D:
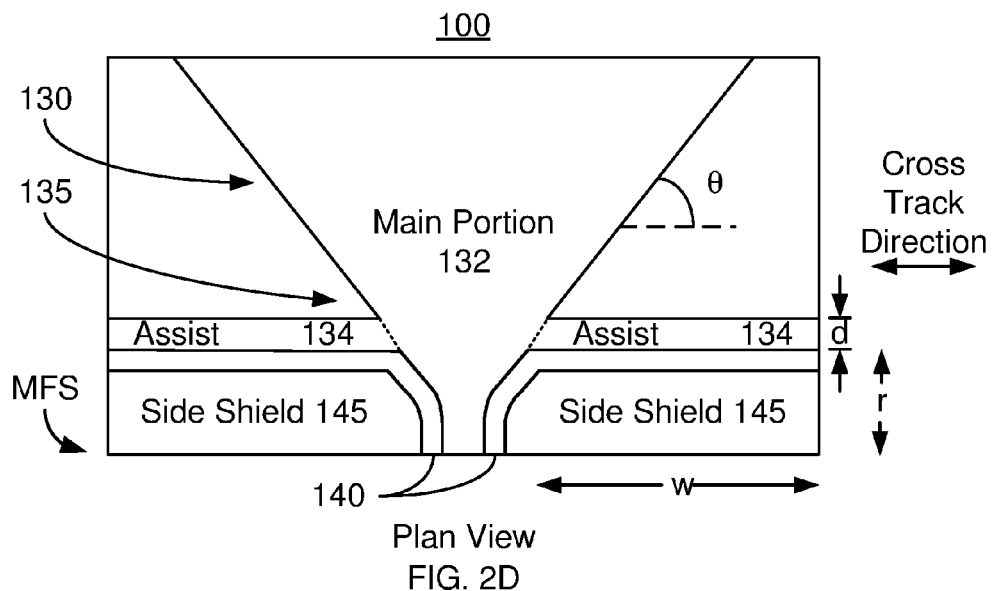

As can be seen in FIG. 2D, the assist portion 134 is also recessed from the MFS. In some embodiments, no part of the assist portion 134 is at the MFS. In other embodiments, some part of the assist portion 134 may be at the MFS far from the pole tip 135. The assist portion is recessed from the MFS by a recess amount, r. In the embodiment shown, the recess amount includes at least the depth of the side shields 145 and the thickness of the side gap 140. The assist portion 134 may be recessed at least one hundred nanometers and not more than three hundred nanometers from the MFS. For example, in some embodiments, the assist portion 134 may be at least one hundred nanometers and not more than one hundred fifty nanometers from the MFS. In other cases, the assist portion 134 may be recessed by at least two hundred nanometers and not more than three hundred nanometers from the MFS. Other recess distances are possible.

The trailing shield 126 has a pole-facing surface which faces the trailing surface 136 of the pole 130. Although shown with a particular shape, in other embodiments, the pole-facing surface of the trailing shield 126 may have a different shape.

The side shields 145 occupy a portion of the MFS and extend along the MFS in the cross-track direction. The side shields are separated from the pole tip 135 of the main portion 132 by the side gap 140. The side gap 140 is nonmagnetic and may have a thickness of not more than sixty nanometers. For example, if the pole 130 is used in perpendicular magnetic recording, the side gap 140 may be at least forty nanometers and not more than sixty nanometers. If the pole 130 is used in shingle magnetic recording, the side gap 140 may be at least ten nanometers and not more than sixty nanometers thick. However, other thicknesses are possible. As mentioned above, the side gap 140 also separates the side shields 145 from the assist portion 134. If the assist portion 134 is nonmagnetic, however, the side gap 140 may be considered part of the assist portion 134.

The side shields 145 are between the assist portion 134 of the pole 130 and the MFS. The side shields 145 have back surfaces opposite to the front surfaces of the side shields 145 that occupy the MFS. The back surfaces of the side shields 145 are adjacent to the assist portion 134 of the main pole 130. In some embodiments, the back surfaces of the side shields 145 share an interface with the assist portion 134. The assist portion 145 of the pole 130 is conformal with the back surfaces of the side shields 145.

Figure 1B:
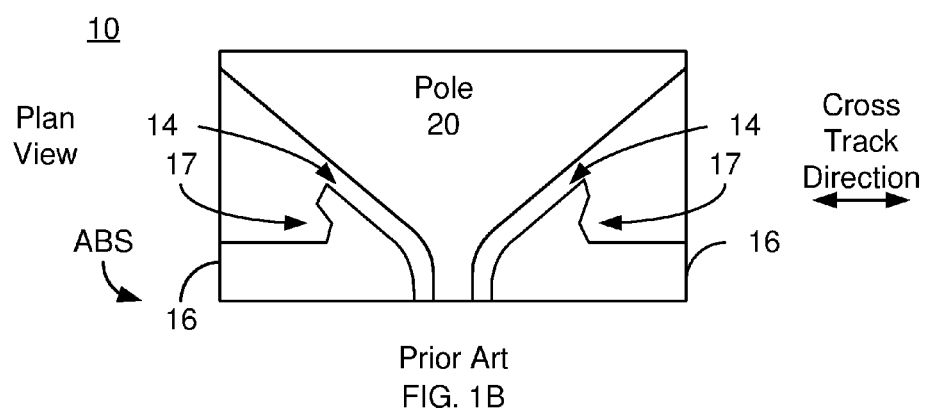

The magnetic data storage device 100 may exhibit improved performance. Because of the presence of the assist portion 134, the throat height of the side shields 145 may be better controlled. For example, the presence of the tails 17 depicted in FIG. 1 may be avoided. Thus, flux shunting and other issues with performance may be mitigated. The presence of the assist portion 134 may also address wide area track erasure (WATEr) issues. It is believed that the assist portion 134 may divert a desired amount of flux, which may reduce unwanted erasure. Thus, performance of the disk drive 100 and write apparatus 120 may be improved.

Figure 3:
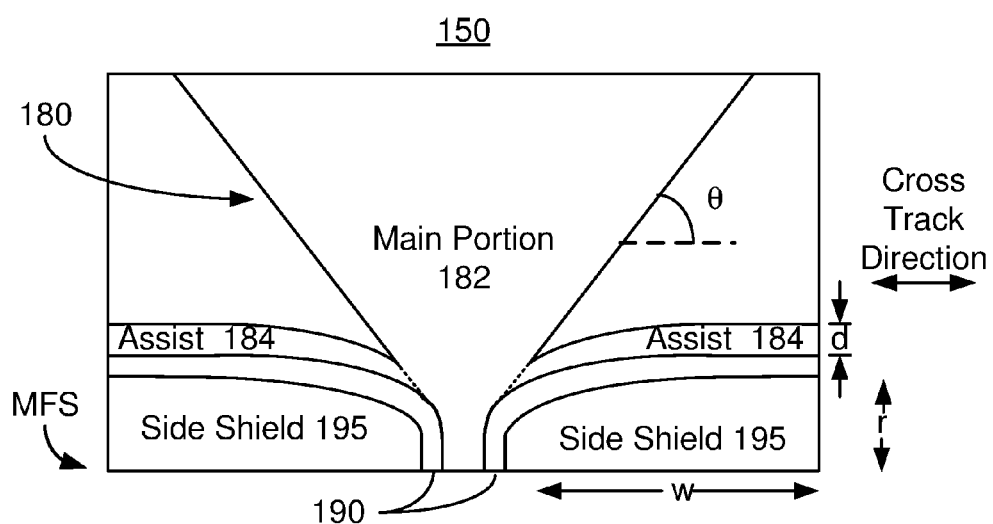
FIG. 3 depicts a top view of another exemplary embodiment of a magnetic recording apparatus.

FIG. 3 depicts a plan view of another exemplary embodiment of a magnetic recording apparatus 150 that may be used in a data storage device such as the data storage device 100. For clarity, FIG. 3 is not to scale. For simplicity not all portions of the write apparatus 150 are shown. The data storage device may but need not be a disk drive. The magnetic write apparatus 150 is analogous to the write apparatus 120 and may be used in the magnetic disk drive 100. Thus, analogous components have similar labels. Further, as the side, apex and MFS views of the apparatus 150 are analogous to that of the apparatus 120, only a plan view is shown. Thus, the write apparatus 150 includes coils (not shown), write gap (not shown), optional leading shield (not shown), optional trailing shield (not shown), pole 180, side gap 190 and side shields 195 that are analogous to the coils 122, write gap 124 leading shield 123, trailing shield 126, pole 130, side gap 140 and side shields 145, respectively.

The pole 180 includes a main portion 182 and an assist portion 184 that are analogous to the main portion 132 and assist portion 134, respectively. The pole 180 has leading and trailing surfaces that are analogous to the leading surface 138 and trailing surface 136 of the pole 130. The main portion 182 has a flare angle, θ, that is analogous to the flare angle of the main portion 132. The depth, d, width, w, and recess, r, of the assist portion 184 are analogous to the depth, width and recess of the assist portion 134 depicted in FIGS. 2A-2D. However, the assist portion 184 is curved. Thus, although the assist portion 184 extends from the main portion 182 in the cross track direction, the assist portion 184 also extends in the yoke direction perpendicular to the MFS. Because the assist portion 184 is conformal with the side gap 190 and the back surface of the side shields 195 in the embodiment shown, a portion of the side gap 190 and the back surface of the side shields 195 are also curved.

The magnetic recording apparatus 150 shares the benefits of the data storage device 100 and magnetic recording apparatus 120. The magnetic recording apparatus 150 thus may exhibit improved performance. Because of the presence of the assist portion 184, the throat height of the side shields 195 may be better controlled and issues with performance may be mitigated. The assist portion 184 may also aid in addressing WATEr issues. Thus, performance of the write apparatus 180 may be improved.

Figure 4:
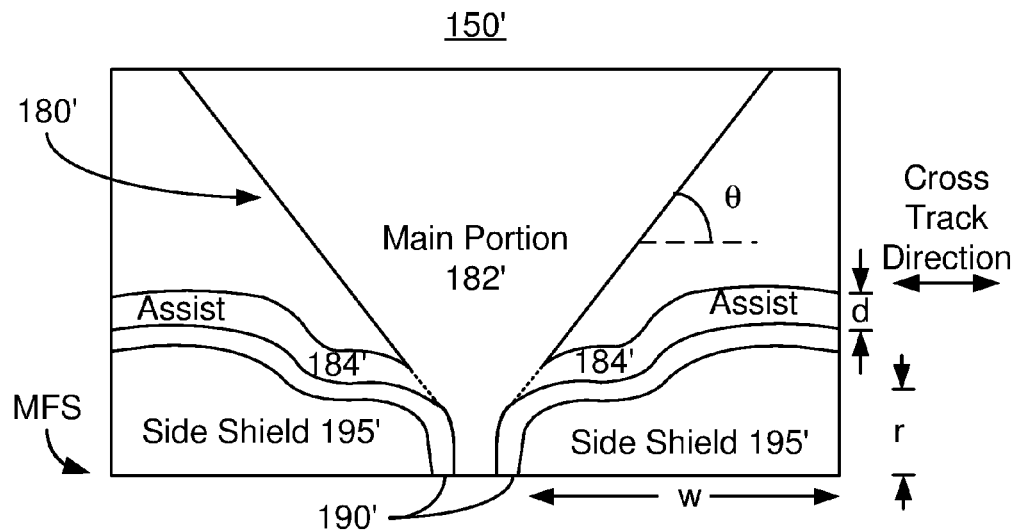
FIG. 4 depicts a top view of another exemplary embodiment of a magnetic recording apparatus.

FIG. 4 depicts a plan view of another exemplary embodiment of a magnetic recording apparatus 150' that may be used in a data storage device such as the data storage device 100. For clarity, FIG. 4 is not to scale. For simplicity not all portions of the write apparatus 150' are shown. The data storage device may but need not be a disk drive. The magnetic write apparatus 150' is analogous to the write apparatus 120 and 150. The magnetic write apparatus 150' may be used in the magnetic disk drive 100. Thus, analogous components have similar labels. Further, as the side, apex and ABS views of the apparatus 150' are analogous to that of the apparatus 120, only a plan view is shown. Thus, the write apparatus 150' includes coils (not shown), write gap (not shown), optional leading shield (not shown), optional trailing shield (not shown), pole 180', side gap 190' and side shields 195' that are analogous to the coils 122, write gap 124 leading shield 123, trailing shield 126, pole 130 and 180, side gap 140 and 190 and side shields 145 and 195, respectively.

The pole 180' includes a main portion 182' and an assist portion 184' that are analogous to the main portion 132 and 182 and assist portion 134 and 184, respectively. The pole 180' has leading and trailing surfaces that are analogous to the leading surface 138 and trailing surface 136 of the pole 130. The main portion 182' has a flare angle, θ, that is analogous to the flare angle of the main portion 132 and 182. The depth, d, width, w, and recess, r, of the assist portion 184' are analogous to the depth, width and recess of the assist portion 134 and 184. However, the assist portion 184' is curved such that there are multiple bends in the assist portion 184'. Thus, although the assist portion 184' extends from the main portion 182' in the cross track direction, the assist portion 184' also extends in the yoke direction perpendicular to the MFS. Because the assist portion 184' is conformal with the side gap 190' and the back surface of the side shields 195' in the embodiment shown, a portion of the side gap 190' and the back surface of the side shields 195' are also curved in an analogous manner.

The magnetic recording apparatus 150' shares the benefits of the data storage device 100 and magnetic recording apparatus 120 and 150. The magnetic recording apparatus 150' thus may exhibit improved performance. Because of the presence of the assist portion 184', the throat height of the side shields 195' may be better controlled and issues with performance may be mitigated. The assist portion 184' may also aid in addressing WATEr issues. Thus, performance of the write apparatus 180' may be improved.

Figure 5:
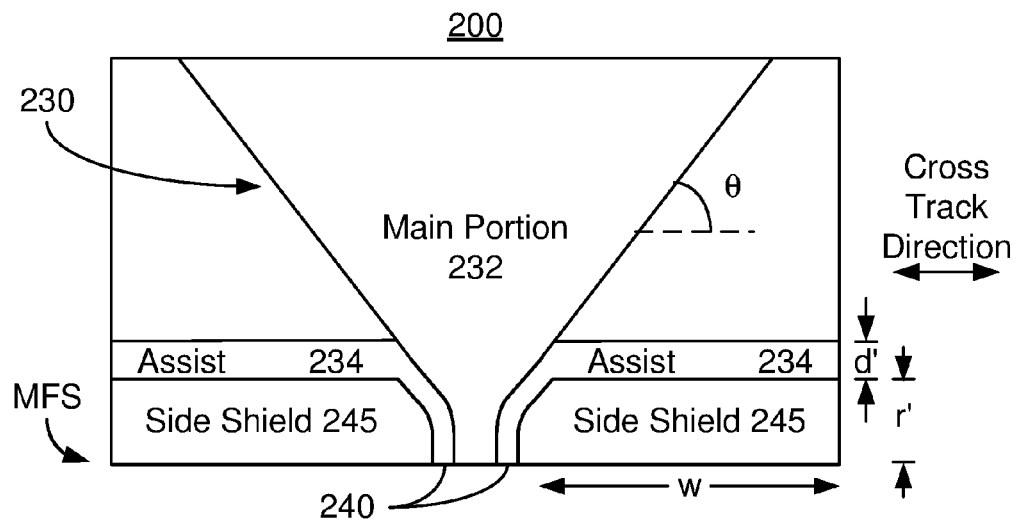
FIG. 5 depicts a top view of another exemplary embodiment of a magnetic recording apparatus.

FIG. 5 depicts a plan view of another exemplary embodiment of a magnetic recording apparatus 200 that may be used in a data storage device such as the data storage device 100. For clarity, FIG. 5 is not to scale. For simplicity not all portions of the write apparatus 200 are shown. The data storage device may but need not be a disk drive. The magnetic write apparatus 200 is analogous to the write apparatus 120, 150 and 150'. The magnetic write apparatus 200 may be used in the magnetic disk drive 100. Thus, analogous components have similar labels. Further, as the side, apex and ABS views of the apparatus 200 are analogous to that of the apparatus 120, only a plan view is shown. Thus, the write apparatus 200 includes coils (not shown), write gap (not shown), optional leading shield (not shown), optional trailing shield (not shown), pole 230, side gap 240 and side shields 245 that are analogous to the coils 122, write gap 124 leading shield 123, trailing shield 126, pole 130, 180 and 180', side gap 140, 190 and 190' and side shields 145, 195 and 195', respectively.

The pole 230 includes a main portion 232 and an assist portion 234 that are analogous to the main portion 132, 182 and 182' and assist portion 134, 184 and 184', respectively. The pole 230 has leading and trailing surfaces that are analogous to the leading surface 138 and trailing surface 136 of the pole 130. The main portion 232 has a flare angle, θ, that is analogous to the flare angle of the main portion 132, 182 and 182'. The depth, d, width, w, and recess, r, of the assist portion 234 are analogous to the depth, width and recess of the assist portion 134, 184 and 184'. Although shown as straight, the assist portion 234 might be curved.

In addition, the assist portion 234 is nonmagnetic. In the embodiment shown, the assist portion 234 and side gap 240 are formed of the same material. The main portion 232 of the pole 230 is, however, ferromagnetic.

The magnetic recording apparatus 200 shares the benefits of the data storage device 100 and magnetic recording apparatus 120, 150 and 150'. The magnetic recording apparatus 200 thus may exhibit improved performance. Because of the presence of the assist portion 234, the throat height of the side shields 245 may be better controlled and issues with performance may be mitigated. Thus, performance of the write apparatus 200 may be improved.

Figure 6:
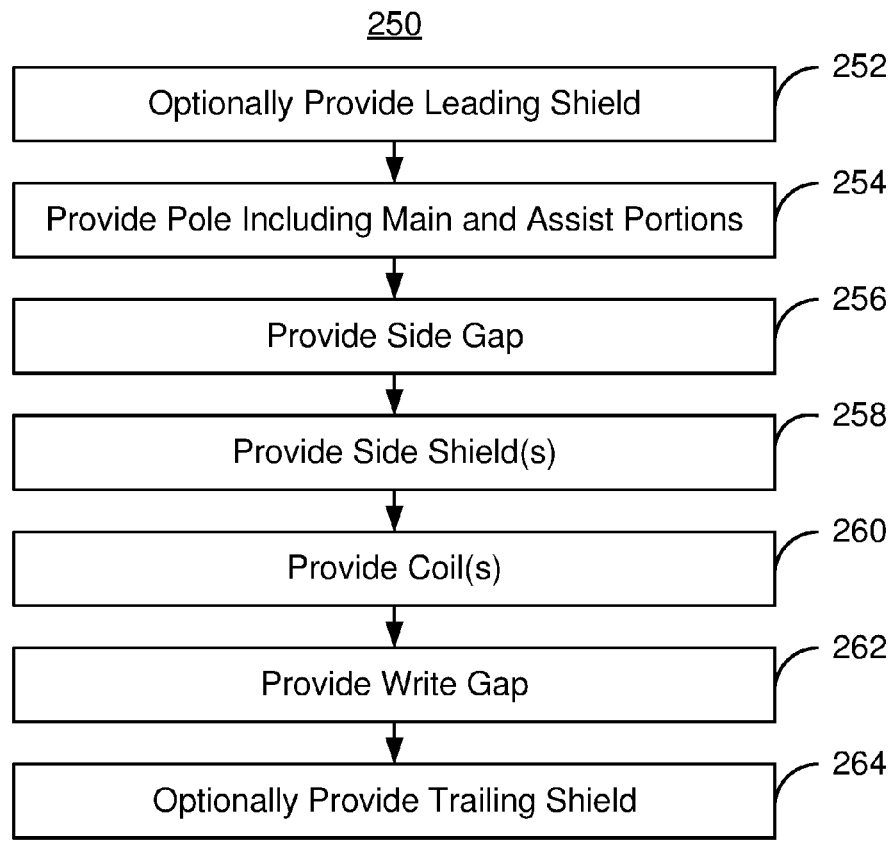
FIG. 6 is a flow chart depicting an exemplary embodiment of a method for providing magnetic recording apparatus.

FIG. 6 depicts an exemplary embodiment of a method 250 for providing a magnetic recording apparatus 120, 150, 150' and/or 200. For simplicity, some steps may be omitted, interleaved, combined and/or include substeps. The method 250 is also described in the context of providing a data storage device 100 and magnetic recording apparatus 120 depicted in FIGS. 2A-2D. The method 250 may also be used to fabricate other magnetic recording apparatuses including but not limited to any combination of 150, 150' and/or 200. The method 250 may be used to fabricate multiple magnetic recording heads at substantially the same time. The method 250 is also described in the context of particular layers. A particular layer may include multiple materials and/or multiple sub-layers. The method 250 also may start after formation of other portions of the magnetic recording head. For example, the method 250 may start after a read apparatus, return pole/leading shield and/or other structure have been fabricated.

Referring to FIGS. 2A-2D and 6, the leading shield 123 may optionally be provided, via step 252. The pole 130 is provided, via step 254. Step 254 may include using one or more damascene processes. For example, a trench may be formed in a layer. The trench may be fabricated such that portions of the trench have the desired shape and location of the main portion 132 and assist portion 134 of the pole 130. The width of the trench may also vary to form pole tip 135 and yoke 137 of the main portion. The trench may also be configured so that the beveled leading surface 138 is naturally formed as the trench is filled. The material(s) for the pole 130 are deposited, for example via plating. One or more ferromagnetic materials may be used. In some embodiments, ferromagnetic material(s) are used for both the main portion 132 and the assist portion 134. In other embodiments, ferromagnetic material(s) may be used for the main portion 132, but the assist portion 134 is nonmagnetic. Other methods may also be used to form the pole 130 including but not limited to full film deposition of the appropriate materials and removal for example via milling and/or lapping.

The side gap is provided, via step 256. Step 256 may be performed before or interleaved with step 254. For example, if a damascene process is used, then the side gap may be deposited in the trench before deposition of ferromagnetic pole material(s). However, formation of the assist portion 134, 184, 184' and/or 234 is completed before formation of the side shields.

The side shield(s) 145 are provided, via step 258. Step 258 may include removing material(s) in the location of the side shields, providing a mask and depositing the side shield material(s). In some embodiments, the side shield material(s) may be plated.

The coil(s) 122 are also provided, via step 260. Portions of step 260 may thus be interleaved with the remaining steps of the method 250. For example, portions of the coils 122 may be provided before the formation of the pole 130. However, other portions of the coil 122 may be provided after some or all of the pole 130 has been formed. Step 260 may also include depositing and patterning the material(s) used for the coil(s) 122. Step 260 may include forming one or more helical coils or one or more pancake/spiral coil. In such embodiments, a spiral coil 122 may include other turns far from the MFS.

The write gap 124 may be provided, via step 262. Step 262 includes depositing a nonmagnetic material. One or more layers may be deposited in step 262. The material may be conformally deposited. In addition, portions of the write gap may be removed to provide a write gap that has varying thicknesses.

The trailing shield 126 may be provided, via step 264. Using the method 250, the data storage device 100 and magnetic apparatuses 120, 150, 150' and/or 200 may be provided. Thus, the benefits of the magnetic apparatuses 120, 150, 150' and/or 200 may be achieved.

Figure 7:
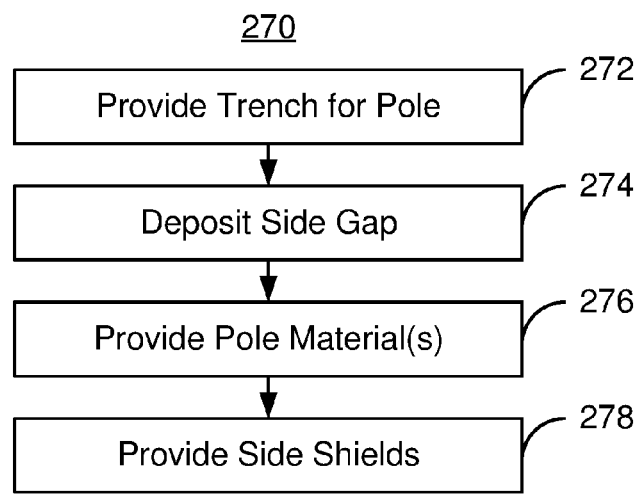
FIG. 7 is a flow chart depicting an exemplary embodiment of a method for providing a pole and side shields of a magnetic recording apparatus.

FIG. 7 depicts an exemplary embodiment of a method 270 for providing a magnetic recording apparatus. For simplicity, some steps may be omitted, interleaved, combined and/or include substeps. FIGS. 8-11 depict plan views of an exemplary embodiment of a magnetic recording apparatus 300 during fabrication using the method 270. The method 270 is also described in the context of providing the magnetic recording apparatus 300 depicted in FIGS. 8-11. The method 270 may also be used to fabricate other magnetic recording apparatuses including but not limited to any combination of 120, 150, 150' and/or 200. The method 270 may be used to fabricate multiple magnetic recording heads at substantially the same time. The method 270 is also described in the context of particular layers. A particular layer may include multiple materials and/or multiple sub-layers. The method 270 also may start after formation of other portions of the magnetic recording apparatus 300. For example, the method 270 may start after a read apparatus, return pole/leading shield and/or other structure have been fabricated.

Figure 8:
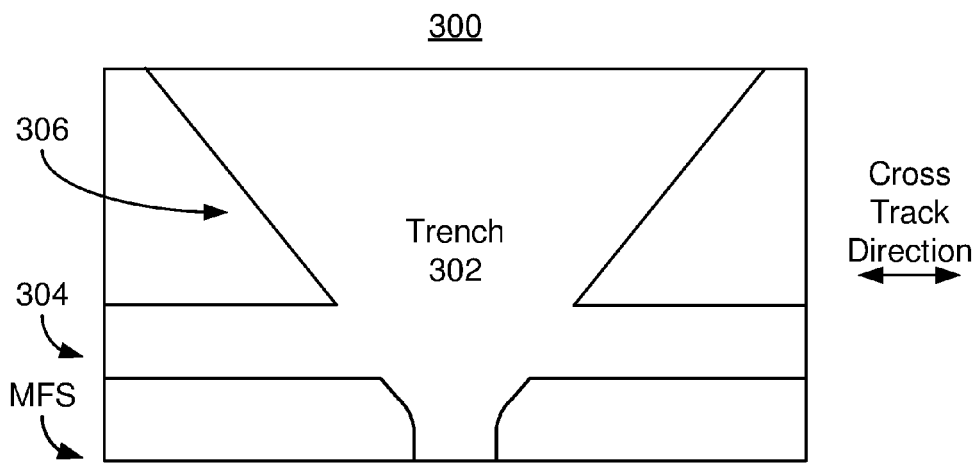
FIGS. 8-11 depict top views of another exemplary embodiment of a magnetic recording apparatus during fabrication.

A trench is formed in a nonmagnetic layer, via step 272. Step 272 may include providing a mask and performing a reactive ion etch (RIE) of the exposed nonmagnetic layer. In some embodiments, the nonmagnetic layer is aluminum oxide. FIG. 8 depicts the magnetic recording apparatus 300 after formation of the trench 302. The trench 302 includes a main portion 306 and an assist portion 304. In the embodiment shown, the assist portion 304 has sidewalls parallel to the MFS. In other embodiments, the sidewalls for the assist portion may be curved. The trench 302 may also be configured so that the beveled leading surface is naturally formed as the trench is filled.

Figure 9:
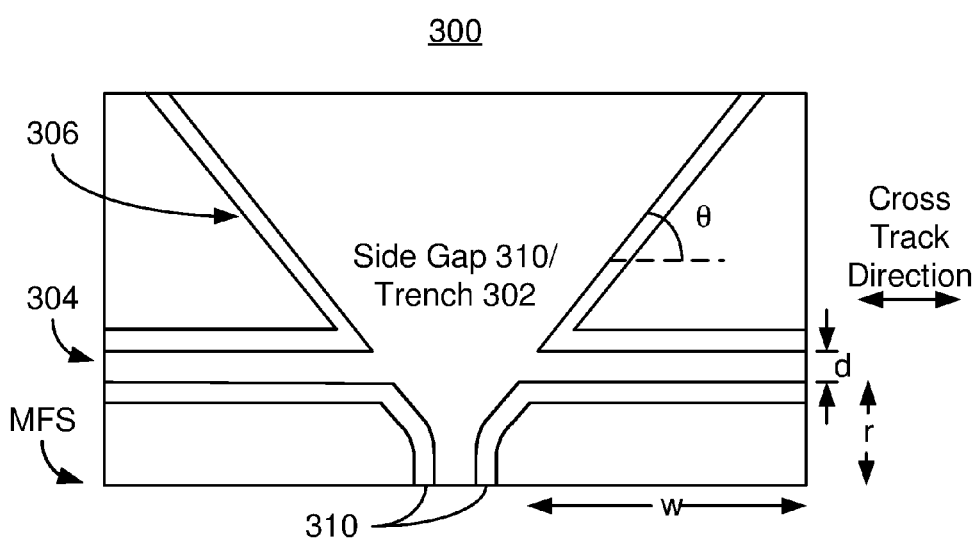

The side gap is deposited, via step 274. Step 274 may include depositing a Ru layer, for example via atomic layer deposition (ALD). In other embodiments, other nonmagnetic materials and/or other deposition methods may be used. FIG. 9 depicts the magnetic recording apparatus 300 after step 274 is performed. Thus, the side gap 310 has been deposited. The thickness of the side gap material deposited is small enough that no portion of the trench is filled. Thus, part of the assist portion 304 and part of the main portion 306 of the trench remain open. The depth, d, of the open part of the assist portion 304 of the trench 302 may be the depth of the assist portion of the pole being formed. In an alternate embodiment, the assist portion 304 of the trench 302 may be narrow enough and the side gap layer 310 thick enough that the assist portion 304 of the trench 302 is filled. In such an embodiment, the assist portion of the pole may be nonmagnetic and formed of the side gap materials.

Figure 10:
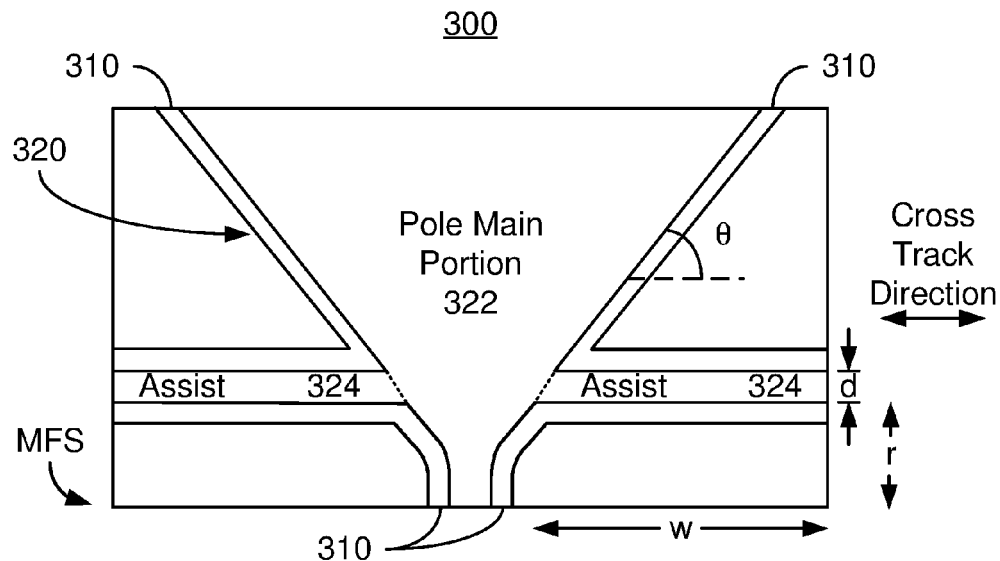

The material(s) for the pole are deposited, via step 276. In some embodiments, step 276 is performed via plating. One or more ferromagnetic materials may be used. The trench 302 is thus filled. In some cases, different materials may be used to fill the assist portion 304 of the trench 302 than to fill the main portion 306 of the trench 302. For example, ferromagnetic materials having different saturation magnetizations may be used. In other embodiments, the main portion 306 of the trench 302 may be filled with ferromagnetic materials while nonmagnetic materials may be used for the assist portion of the trench. In some embodiments, the amount of pole material(s) is thicker than required to fill the trench. A planarization such as a chemical mechanical planarization (CMP) may thus be performed. In some embodiments, a trailing edge bevel is also formed in the pole. FIG. 10 depicts the magnetic recording apparatus 300 after step 276 is performed. Thus, a pole 320 including a main portion 322 and an assist portion 324 has been formed. The main portion 322 has a flare angle θ. The assist portion 324 has a depth d, a width w and is recessed from the MFS by a recess distance, r. As can be seen in FIG. 10, the sides of the main portion 322 and assist portion 324 of the pole 320 are separated from the underlying layer by the side gap 320.

Figure 11:
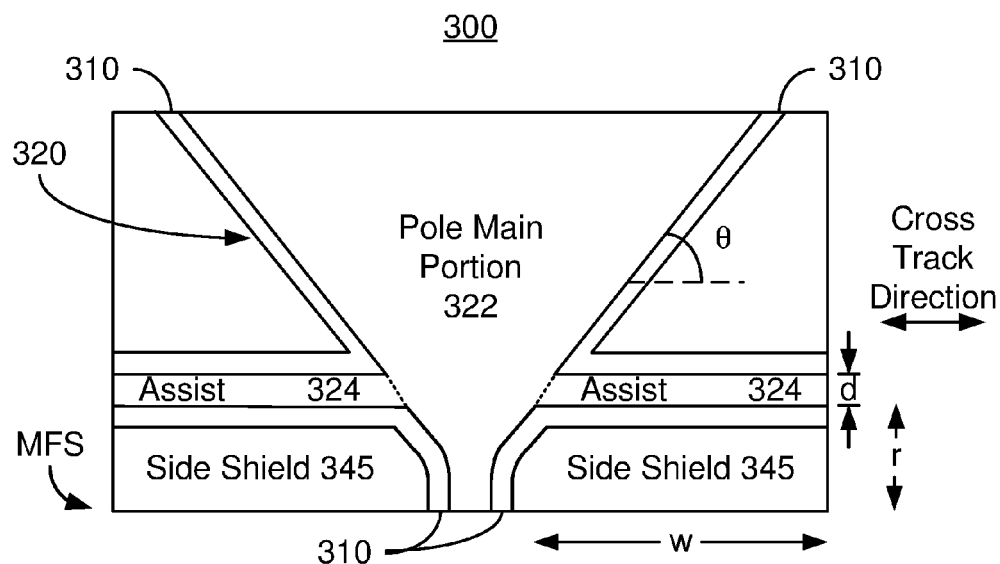

The side shield(s) are provided, via step 278. Step 278 may include removing the underlying layer in which the trench was formed that remains in the location of the side shields. For example, an aluminum oxide wet etch may be performed. Because of the presence of the side gap 310, the main portion 322 and assist portion 324 of the pole 320 may not be adversely affected. A mask may be provided and the side shield materials deposited in step 278. For example, NiFe and/or other materials for the side shield may be plated. FIG. 11 depicts the magnetic write apparatus 300 after step 278 is performed. Thus, the side shields 345 have been formed. Fabrication of the magnetic recording apparatus may then be continued.

Using the method 270, the magnetic recording apparatus 300 may be provided. The formation of the assist portion 324 and side gap 310 may prevent or reduce formation of tails and other features that may adversely affect the throat height of the side shields 345. Thus, flux shunting and other issues with performance may be mitigated. The presence of a ferromagnetic assist portion 324 may also reduce WATEr issues. Thus, performance of the write apparatus 300 may be improved.

What is claimed is:

1. A magnetic write apparatus having a media-facing surface (MFS) comprising:
a pole including a main portion and an assist portion, the main portion being ferromagnetic, the main portion including a pole tip and at least one side surface having a flare angle from the MFS, the pole tip occupying a first portion of the MFS, the flare angle being nonzero and acute, the assist portion adjoining the main portion and extending from the main portion in a direction having a component parallel to the MFS in a cross-track direction, the assist portion having a front surface facing the MFS and a depth in a depth direction substantially perpendicular to the front surface of not more than three hundred nanometers;

at least one side shield occupying a second portion of the MFS and having a back surface, the at least one side shield being between the assist portion and the MFS, the assist portion being conformal with the back surface of the at least one side shield; and a side gap between the main portion of the pole and the at least one side shield; and at least one coil for energizing the pole.

2. The magnetic write apparatus of claim 1 wherein the assist portion has a depth of not more than one hundred nanometers.

3. The magnetic write apparatus of claim 2 wherein the depth is not more than fifty nanometers.

4. The magnetic write apparatus of claim 1 wherein the assist portion has a width of at least 0.2 microns and not more than 2 microns in the cross-track direction.

5. The magnetic write apparatus of claim 1 wherein the assist portion is recessed by at least one hundred nanometers and not more than three hundred nanometers from the MFS.

6. The magnetic write apparatus of claim 1 wherein the assist portion is substantially parallel to the MFS.

7. The magnetic write apparatus of claim 1 wherein the assist portion is curved.

8. The magnetic write apparatus of claim 1 wherein the assist portion is nonmagnetic.

9. The magnetic write apparatus of claim 1 wherein the assist portion is ferromagnetic and wherein a portion of the side gap resides between the assist portion and the at least one side shield.

10. The magnetic write apparatus of claim 1 further comprising:

a trailing shield; and a write gap, a portion of the write gap residing between the trailing shield and the pole tip.

11. The magnetic write apparatus of claim 1 wherein the flare angle is at least forty-five degrees and not more than seventy degrees.

12. A data storage device comprising:

a media; and a magnetic write apparatus having a media-facing surface, the magnetic write apparatus including a pole, at least one side shield, a side gap and at least one coil for energizing the pole, the pole including a main portion and an assist portion, the main portion being ferromagnetic, the main portion including a pole tip and at least one side surface having a flare angle from the MFS, the pole tip occupying a first portion of the MFS, the flare angle being nonzero and acute, the assist portion adjoining the main portion and extending from the main portion in a direction having a component parallel to the MFS in a cross-track direction, the assist portion having a front surface facing the MFS and a depth in a depth direction substantially perpendicular to the front surface of not more than three hundred nanometers, the at least one side shield occupying a second portion of the MFS and having a back surface, the at least one side shield being between the assist portion and the MFS, the assist portion being conformal with the back surface of the at least one side shield, the a side gap being between the main portion of the pole and the at least one side shield.

13. The data storage device of claim 12 wherein the depth is not more than fifty nanometers.

14. The data storage device of claim 12 wherein the assist portion has a width of at least 0.8 microns and not more than 2 microns in a cross-track direction.

15. The data storage device of claim 12 wherein the assist portion is recessed by at least one hundred nanometers and not more than three hundred nanometers from the MFS.

16. The data storage device of claim 12 wherein the assist portion is ferromagnetic and wherein a portion of the side gap resides between the assist portion and the at least one side shield.

17. A method for providing a magnetic write apparatus having a media-facing surface (MFS) comprising:

providing a pole including a main portion and an assist portion, the main portion being ferromagnetic, the main portion including a pole tip and at least one side surface having a flare angle from the MFS, the pole tip occupying a first portion of the MFS, the flare angle being nonzero and acute, the assist portion adjoining the main portion and extending from the main portion in a direction having a component parallel to the MFS in a cross-track direction, the assist portion having a front surface facing the MFS and a depth in a depth direction substantially perpendicular to the front surface of not more than three hundred nanometers;

providing at least one side shield occupying a second portion of the MFS and having a back surface, the at least one side shield being between the assist portion and the MFS, the assist portion being conformal with the back surface of the at least one side shield; and providing a side gap between the main portion of the pole and the at least one side shield; and providing at least one coil for energizing the pole.

18. The method of claim 17 wherein the depth is not more than fifty nanometers.

19. The method of claim 17 wherein the assist portion has a width of at least 0.8 microns and not more than 2 microns in a cross-track direction.

20. The method of claim 17 wherein the assist portion is recessed by at least one hundred nanometers and not more than three hundred nanometers from the MFS.

21. The method of claim 17 wherein the assist portion is ferromagnetic and wherein a portion of the side gap resides between the assist portion and the at least one side shield.

* * * * *